United States Patent [19]

Pettinga et al.

[11] Patent Number: 4,679,368
[45] Date of Patent: Jul. 14, 1987

[54] RAIL PANEL MOUNTING LATCH

[75] Inventors: Frederic R. Pettinga, Grand Rapids; Steve F. Goodman, Wyoming, both of Mich.

[73] Assignee: Herman Miller, Inc., Zeeland, Mich.

[21] Appl. No.: 797,446

[22] Filed: Nov. 13, 1985

[51] Int. Cl.[4] .......................................... A47H 27/00
[52] U.S. Cl. ........................................ 52/36; 52/127.6; 52/243.1; 211/192; 248/225.1; 248/225.2; 312/245; 403/252; 403/327
[58] Field of Search ............... 52/29, 36, 127.5–127.8, 52/127.11, 127.12, 238.1, 243, 243.1, 486, 489, 506, 510; 211/192; 248/222.1, 225.1, 225.2; 312/245; 403/252, 254, 327

[56] References Cited

U.S. PATENT DOCUMENTS

| | | | |
|---|---|---|---|
| 3,193,225 | 7/1965 | Terlinde | 248/221.2 |
| 3,534,517 | 10/1970 | Kann | 52/239 |
| 3,545,626 | 12/1970 | Seiz | 211/192 |
| 3,626,652 | 12/1971 | Hanley | 52/584 |
| 3,672,710 | 6/1972 | Kroopp | 403/252 |
| 3,697,034 | 10/1972 | Shell | 248/243 |
| 3,891,172 | 6/1975 | Einhorn | 248/221.2 |
| 4,004,856 | 1/1977 | Wesseler | 403/186 |
| 4,228,906 | 10/1980 | Jones | 211/126 |
| 4,323,213 | 4/1982 | Rock et al. | 248/222.1 |
| 4,352,587 | 10/1982 | Milz | 403/252 |
| 4,387,872 | 6/1983 | Hogue | 248/221.3 |
| 4,401,222 | 8/1983 | Kulikowski | 211/94 |

FOREIGN PATENT DOCUMENTS

| | | | |
|---|---|---|---|
| 2603228 | 1/1977 | Fed. Rep. of Germany | 403/252 |
| 2732910 | 2/1979 | Fed. Rep. of Germany | 403/252 |
| 2236397 | 10/1982 | Fed. Rep. of Germany | 312/245 |
| 319046 | 12/1969 | Sweden | 403/252 |
| 2044970A | 10/1980 | United Kingdom | 211/192 |

Primary Examiner—John E. Murtagh
Assistant Examiner—Andrew Joseph Rudy
Attorney, Agent, or Firm—Varnum, Riddering, Schmidt & Howlett

[57] ABSTRACT

A latch (10) removably mounts a rail-containing panel (12) to a vertical slotted standard (14). The latch (10) is secured to the rear side (118) of the panel (12) and comprises a base plate (60), a bar lock (62), a plug lock (64) and a retainer (68). The base plate includes a bar lock guide (70), a plug lock guide (78) and an opening (76) extending through the back wall (72) of the base plate (60). The bar lock (62) is slidably mounted in the bar lock guide (70) and has a lateral notch and a rearwardly-projecting first hook (90) engaging the opening (76). The plug lock (64) is rotatably mounted in the plug lock guide (78) and includes a tab (106) engaging the lateral notch (88). The retainer (68) is rigidly secured to the back wall (72) of the base plate (60). The panel (12) is removably mounted to the standard (14) by first engaging the retainer (68) with a substantially rectangular slot (17) of the standard (14), subsequently engaging the first hook (90) with a substantially square slot (16) of the standard (14) and finally rotating the plug lock (64) in the appropriate direction to drive the bar lock (62) upwardly in the bar lock guide (70), due to the force exerted on the bar lock (62) by the tab (106) of the plug lock (64), to position the first hook (90) in engagement with the rear face (124) of the standard (14) to thus mount the panel (12) to the standard (14).

22 Claims, 4 Drawing Figures

RAIL PANEL MOUNTING LATCH

FIELD OF THE INVENTION

This invention relates to mounting an appurtenance to a supporting structure and more particularly to removably securing a rail-containing panel to a fixed vertical slotted standard.

BACKGROUND OF THE INVENTION

In modular office systems and other modern office designs it is functionally desirable to mount rail-containing panels to the interior wall of a building or a freestanding wall of the modular office system. The panels comprise a plurality of hanger rails on which may be suspended a variety of work accessories, such as paper trays, storage bins, coat and canister racks and the like. It is also desirable to have the panels removably mounted to the walls of the office system so that the position of the panels may be altered to meet the changing needs of a business. To this end, the panels, or supporting brackets to which the same are attached, are provided, on the rear portions thereof, with hooks or tabs adapted to removably engage the slots of vertical standard rigidly secured to the interior or freestanding walls. For example, the patent to Kulikowski et al, U.S. Pat. No. 4,401,222, issued Aug. 30, 1983, discloses a system for mounting a work accessory support rail to a pair of vertical slotted standards. The system includes, on the back surface of the rail, upper and lower mounting flanges adapted to securely receive therebetween a pair of mounting brackets. Each bracket has a plurality of rearwardly-projecting hooks removably received within the slots of the standards.

In order to circumvent damage to the panels and work accessories suspended therefrom and prevent injuries to works which may result from the inadvertent disengagement of the hooks or tabs from the vertical standards, it is desirable to provide a device capable op removably locking the hooks or tabs in engagement with the slots of the standard.

Devices for removably locking the hooks or tabs connected to rail-containing panels and other appurtenances to vertical slotted standards and other similar supports are known. For example, the U.S. Pat. No. 4,228,906 to Jones, issued Oct. 21, 1980, discloses a locking bracket for attaching a horizontal support rail to a vertical slotted standard. The bracket includes an upper downwardly-depending hook extending through aligned slots in the rail and the standard, a central horizontal finger received within another set of aligned slots in the rail and the standard and a lower downwardly-depending hook engaged within a further set of aligned slots in the rail and the standard. The upper and lower hooks interfere with the rear surface of the standard adjacent the slots in which they engage to attach the rail to the standard.

In addition, the U.S. Pat. No. 3,891,172 to Einhorn, issued June 24, 1975, discloses a latch for removably securing an article-supporting member to a multiapertured panel. The support member includes a base and an upwardly-projecting hook extending rearwardly from the upper portion of the base and engaging a selected aperture in the panel. The latch comprises a pin rotatably mounted through the lower portion of the base and an aperture directly below the above-stated selected aperture. A handle is attached to the front end of the pin. The rear end of the pin is provided with a cam spaced from the rear surface of the base and shaped so that, upon rotation of the pin, the cam engages the back side of the panel adjacent the aperture through which it extends to securely mount the support member to the panel.

Further, the U.S. Pat. No. 3,545,626 to Seiz, issued Dec. 8, 1970, discloses a storage structure having a plurality of cross-beams and slotted uprights. A support clip is rigidly secured to each end of each beam and has a series of rearwardly-projecting studs which selectively engage slots in an upright, a hole partially aligned with a slot in the upright and a lock for attaching the cross-beam to the upright. The lock passes through the partially aligned slot and hole to lock the clip to the upright and comprises a shank rotatably engaging the partially aligned slot and hole, a base in flush engagement with the outer surface of the clip, a circular head eccentric with the shank and an arm secured to the base. To securely attach the clip to the upright, the arm is rotated until the head engages the inner surface of the upright. To release the lock, the handle is rotated 180° so as to rotate the head in registry with the slot in the upright permitting outward displacement of the clip and disengagement of the studs with the slots of the upright.

SUMMARY OF THE INVENTION

According to the invention, a wall panel has front and back surfaces and is adapted to be removably mounted to a vertical slotted standard having a plurality of vertically spaced slots and front and rear faces. The panel comprises a support means adapted to extend through a first slot of the standard and to engage the rear face of the standard adjacent the first slot to partially mount the panel to the standard. In addition, the panel includes a latch means mounted to the panel for vertical movement between locked and unlocked positions and adapted to extend through a second slot of the standard, when the latch means is in the unlocked position and the support means extends through the first slot, to engage the rear face of the standard adjacent the second slot, when the latch means is in the locked position and the support means engages the rear face adjacent the first slot, to securely mount the panel to the standard. Also, the panel has an actuating means for actuating movement of the latch means between the locked and unlocked positions.

The panel further comprises a first channel, a second channel and a hole extending through the back surface and in registry with the first channel. The support means comprises a first hook secured to the back surface and adapted to extend through the first slot and engage the rear face adjacent the first slot. The latch means comprises a latch slidably mounted within the first channel and having a second hook adapted to extend through the hole and the second slot and to engage the rear face adjacent the second slot. The actuating means comprises an actuator movably mounted within the second channel, engaging the latch, and adapted to move the latch to the locked position when moved in the first direction and to position the latch in the unlocked position when moved in the second direction. The latch further includes a notch and the actuator includes a tab engaging the notch. Movement of the actuator in the first direction disposes the latch in the locked position through force exerted on the latch by the tab to securely mount the panel to the standard. In addition, a spring is positioned in the first channel and between the latch and a wall of the first channel and biases the second hook in the locked position in engagement with the rear face of the standard.

The panel also comprises an opening extending through the front surface thereof and a warning means viewable through the opening only when the latch is disposed in the unlocked position. The warning means comprises a red mark on a front wall of the latch. In addition, the panel includes an aperture extending through the front surface thereof and through which access may be gained to the actuator to move the actuator in the first and second positions to position the latch in the locked and unlocked positions, respectively.

In another embodiment, the invention comprises a device for removably mounting a panel to the vertical slotted standard. The device comprises a face plate adapted to be secured to the panel and having a front and back surface; and a support means secured to the base plate and adapted to extend through a first slot of the standard and to engage the rear face of the standard adjacent the first slot to at least partially support the panel on the standard. A latch means is mounted to the base plate for vertical movement between locked and unlocked positions and is adapted to extend through a second slot of the standard, when the latch means is in the unlocked position and the support means extends through the first slot, and is adapted to engage the rear face of the standard adjacent the second slot, when the latch means is in the locked position and the support means engages the rear face adjacent the first slot, to securely mount the panel to the standard. In addition, the device includes an actuating means movably mounted to the base plate and for actuating movement of the latch means between the locked and unlocked positions.

The base plate further comprises a first channel, a second channel and a hole extending through the back surface and in registry with the first channel. The support means comprises a first hook secured to the back surface of the base plate and adapted to extend throught the first slot and engage the rear face adjacent the first slot. The latch means comprises a latch slidably mounted within the first channel and having the first hook extending through the hole and adapted to extend through the second slot and to engage the rear face of the standard adjacent the second slot. The actuating means comprises an actuator movably mounted within the second channel engaging the latch and adapted to move the latch in the locked position when moved in the first direction and to move the latch in the unlocked position when moved in the second direction.

The latch also includes a notch and the actuator comprises a tab engaging the notch. To this end, movement of the actuator in the first direction disposes the latch in the locked position, through force exerted on the latch by the tab, to thereby securely mount the panel to the standard. The actuating means further comprises a spring positioned in the first channel and between the latch and a wall of the first channel and for biasing the latch in the locked position in engagement with the rear surface of the vertical standard.

The panel also comprises an opening and the device further comprises a warning viewable through the opening only when the latch is in the unlocked position. The warning means comprises a red dot on the front wall of the latch. The panel also comprises an aperture through which access may be gained through the actuator to move the actuator in the first and second directions to position the latch in the locked and unlocked position, respectively.

BRIEF DESCRIPTION OF THE DRAWINGS

The invention will now be described with reference to the drawings in which.

DESCRIPTION OF THE PREFERRED EMBODIMENTS

Figure 1:
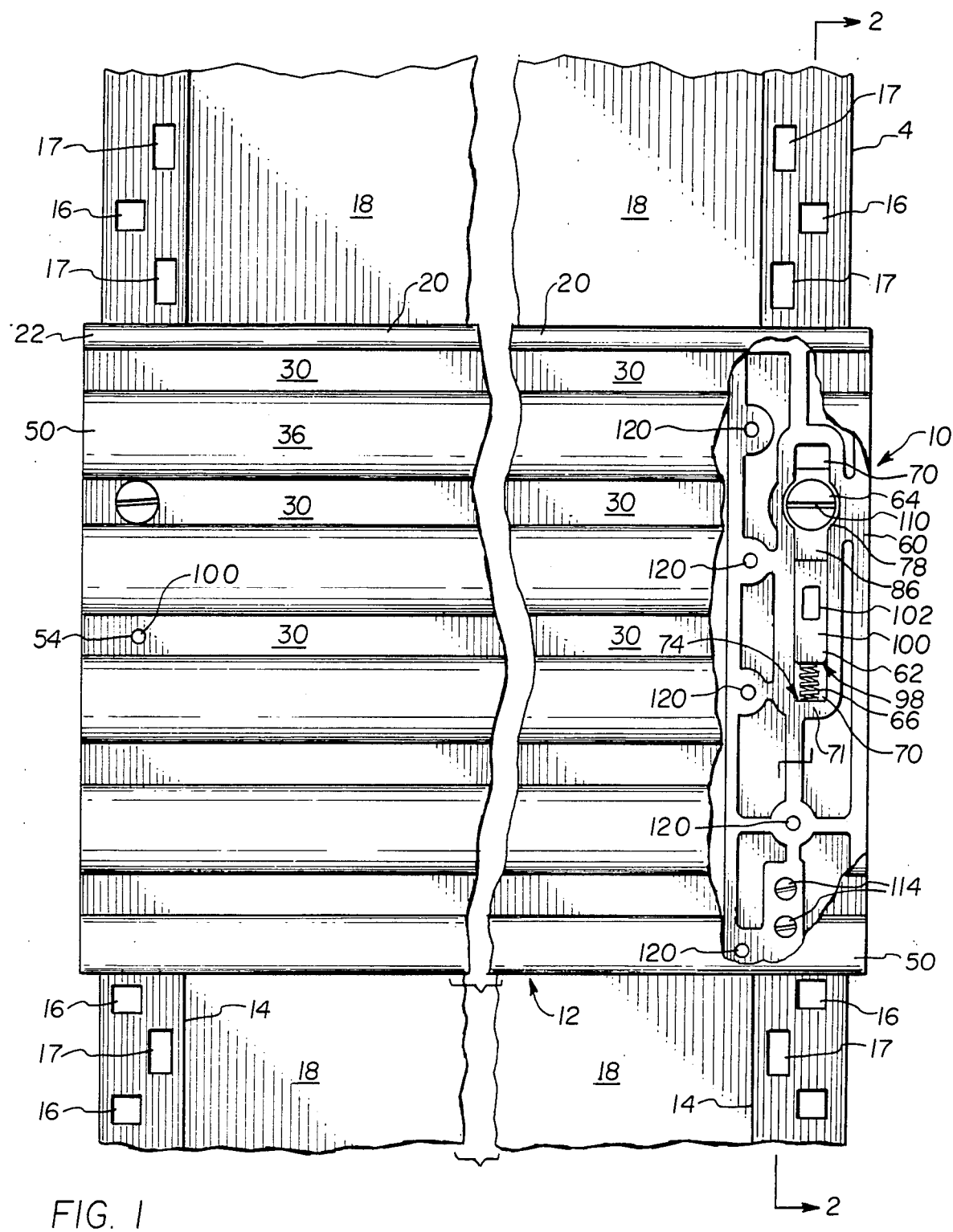
FIG. 1 is a front view of the latch of the invention, in the locked condition, removably securing a rail-containing panel to a wall.
Figure 2:
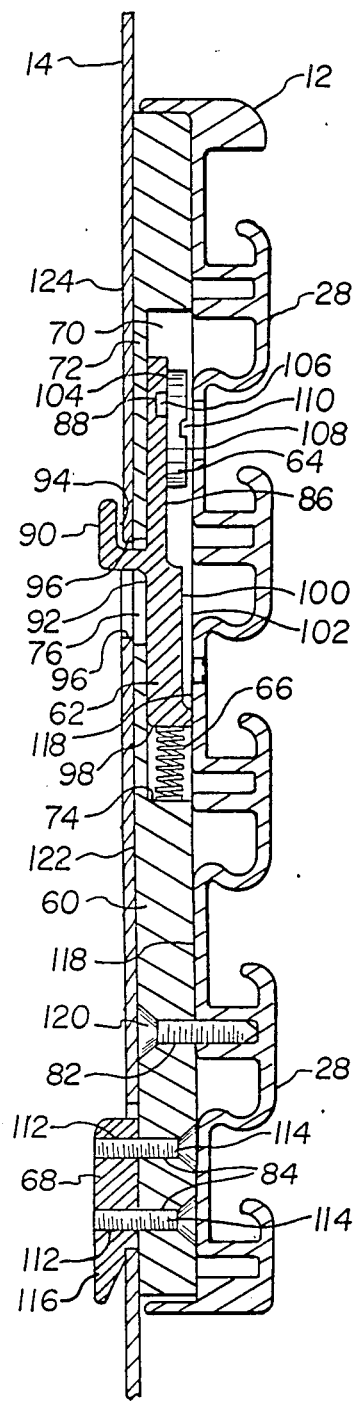
FIG. 2 is a cross-sectional view thereof taken along lines 2—2 of FIG. 1.
Figure 3:
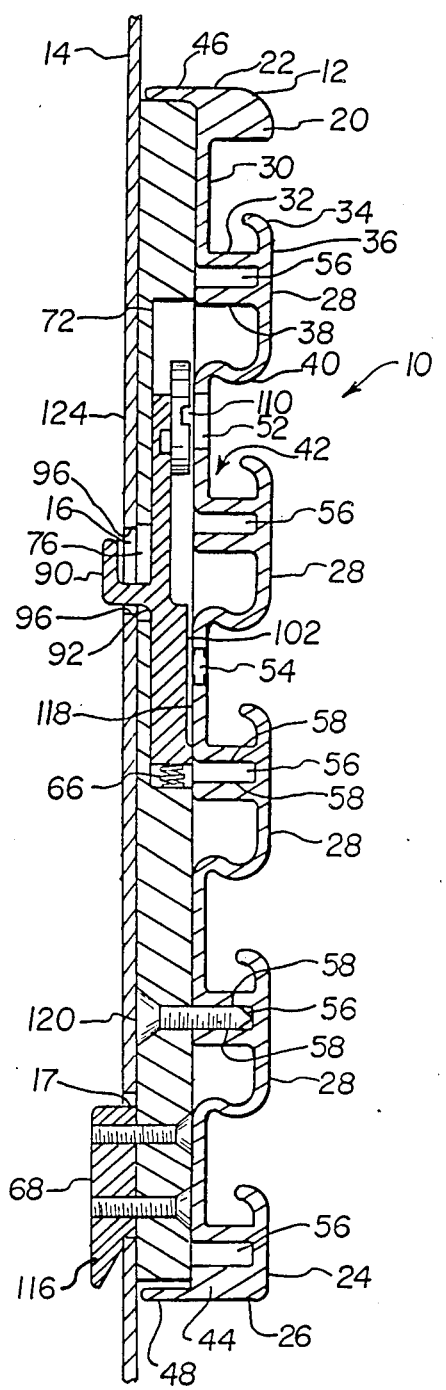
FIG. 3 is a cross-sectional view similar to FIG. 2, but showing the latch in the unlocked condition.
Figure 4:
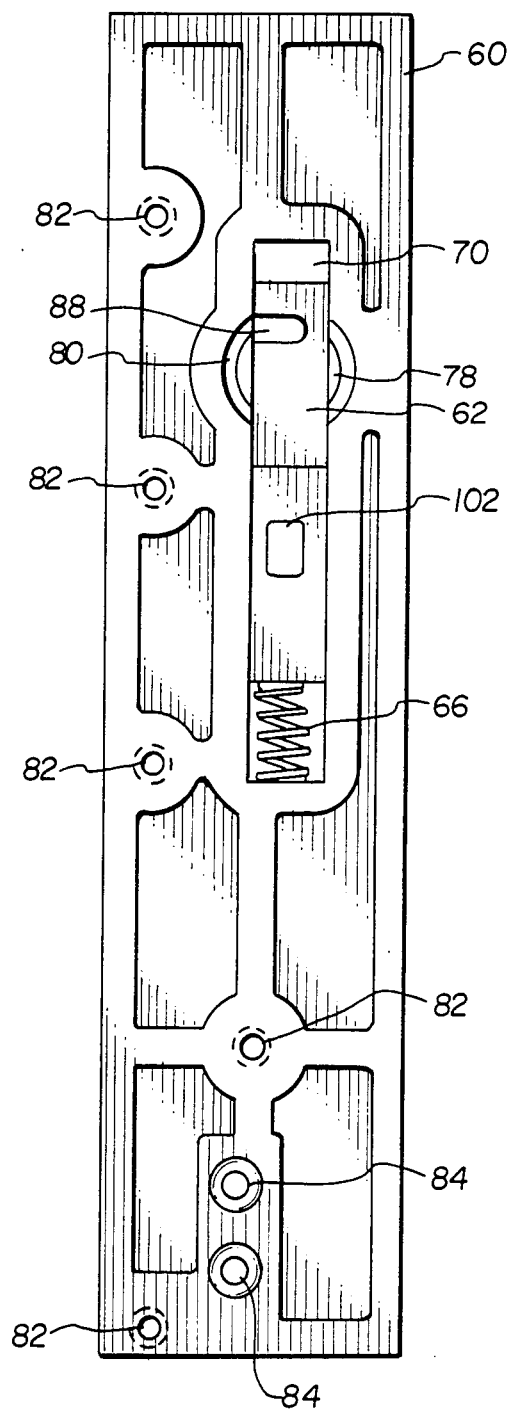
FIG. 4 is a front elevational view of the base plate of the latch and housing the bar lock and the spring of the latch.

Referring to the drawings in detail, there is shown a latch 10 for removably securing a rail-containing panel 12 to a vertical standard 14 having a plurality of substantially square slots 16 (also referred to as "second slots"), a plurality of substantially rectangular slots 17 (also referred to as "first slots") and of the type typically mounted to the interior wall of a building or to the free-standing wall of a modern modular office system of the so-called "open-plan" type, the interior wall or free-standing wall being represented by reference No. 18.

The panel 12 utilized in connection with the invention is of the kind similarly disclosed in Applicant's co-pending application Ser. No. 711,975 filed Mar. 14, 1985. The panel 12 is preferably an extruded member and forms an outwardly-projecting, decorative ridge 20 at the upper portion 22 thereof, a half rail 24 at the bottom portion 26 thereof and a plurality of hanger rails 28 positioned in vertical spaced relationship therebetween. Each hanger rail 28 comprises a vertical portion 30; an outwardly-and horizontally-extending leg 32 integral with the vertical portion 30; and upwardly-and-inwardly extending lip 34 integral with the leg 32; a vertical face 36 also integral with the leg 32; a horizontal support 38 perpendicular to and integral with the vertical face 36; and a curved leg 40 integral with the face 36 and substantially perpendicular to and integral with the vertical portion 30 of a neighboring rail 28. In this manner, the vertical portion 30 forms an indentation 42 above leg 32. The half rail 24 is identical to the hanger rails 28 with the exception that the half rail excludes the curved leg 40 and has a base 44 in lieu of the horizontal support 38.

In the preferred embodiment, the panel 12 comprises a single extruded unitary member. It is contemplated, however, that two or more extruded members, similar to that described above, may be joined to form panel 12.

The hanger rails 28, as well as the half rail 24, function as a means of support for a variety of work accessories (not shown) such as shelf dividers (not shown) and trays (not shown), of the type described and disclosed in commonly assigned co-pending application Ser. No. 711,975, filed Mar. 14, 1985. Specifically, the work accessories removably engage the hanger rails 28 through downwardly depending hooks (not shown) which are received upon the upwardly and inwardly depending lip 34 and within the indentations 42 of the rails 28.

Also, the panel 12 includes an upper flange 46 extending rearwardly from the top portion 22 of the panel 12 and a lower flange 48 extending rearwardly from the bottom portion 26 of the panel 12. The panel 12 has, on each side 50 thereof, a hole 52 extending through the vertical portion 30 of one hanger rail 28 and an aperture 54 extending through the vertical portion 30 of another hanger rail 28 positioned directly adjacent to and below the hanger rail through which the hole 52 extends. In addition, the panel 12 has a plurality of horizontal channels 56 formed by the outwardly-and-horizontally extending legs 32 and the horizontal supports 38 of the hanger rails 28. The legs 32 and the supports 38 form the walls 58 of the channels 56.

The latch 10 comprises a base plate 60, a bar lock 62, a plug lock 64, a spring 66 and a retainer 68. The base plate 60 includes an elongated rectangular bar lock guide 70 (also referred to as first channel) extending into a front wall 71 of the plate, but not through the back wall 72 thereof, and having a bottom side 74. An opening 76 extends through the back wall 72 and is in registry with the bar lock guide 70. A circular plug lock guide 78 (also referred to as second channel) is positioned in front of and substantially overlaps the bar lock guide so as to form shoulders 80 on the base plate 60. In addition, the base plate 60 has a plurality of orifices 82 and a pair of first bores 84.

The bar lock 62 is an elongated member and comprises upper recessed portion 86, a lateral notch 88 recessed within the upper recessed portion 86, a rearwardly and upwardly extending first hook 90 projecting from the rear surface 92 of the bar lock 62, adapted to engage a substantially square slot 16 of the standard 14 and having a forward surface 94 which, as hereinafter described, functions as a camming surface. In addition, the bar lock 62 is vertically and slidably positioned within the bar lock guide 70 such that the first hook 90 extends through the opening 76 in the back wall 72 of the base plate 60. So positioned, vertical movement of the bar lock 62 in the bar lock guide 70 is limited by engagement of the first hook 90 with the upper and lower edges 96 of the opening 76. Further, the bar lock 62 includes a lower surface 98 and, on the front surface 100 thereof, a red mark 102, the function of which will be more fully explained hereinafter.

The spring 66 is positioned in the bar lock guide 70 and in sandwiched relationship between the bottom side 74 of the bar lock guide and the lower surface 98 of the bar lock 62. In this manner, the spring biases the bar lock 62 upwardly within the bar lock guide to set the first hook 90 in its upper position and in engagement with the upper edge 96 of the opening 76.

The plug lock 64 is a substantially disc-shaped member and has extending rearwardly from the back surface 104 thereof an eccentric tab 106. In addition, the plug lock 64 is rotatably mounted within the plug lock guide 78 and is positioned in overlapping relationship with respect to the bar lock 62 such that the tab 106 engages the lateral notch 88 in the upper recessed portion 86 of the bar lock and plug lock rests on the shoulders 80 of the base plate 60. Also, the plug lock 64 includes, on the front surface 108 thereof, a recessed bar 110 adapted to receive a conventional screw driver (not shown) for rotating the plug lock within the plug lock guide. Rotation of the plug lock 64 in the counter-clockwise direction slides the bar lock 62 downwardly in the bar lock guide, due to the downward force exerted on the laterl notch of the bar lock by the tab 106 of the plug lock, and against the force of the spring 66, to position the first hook 90 out of engagement with the upper edge 96 of the opening 76 and into its lower position. In this manner, the plug lock 64 functions as a means of actuating movement of the bar lock 62.

In the preferred embodiment, the retainer 68 has extending therethrough a pair of second bores 112 correspondingly aligned with the pair of first bores 84 of the base plate 60 and is rigidly secured to the back wall 72 of the base plate by a pair of first pins 114 which extend through the first bores 84 and into the second bores 112. It is contemplated, however, that the retainer 68 may be formed integral with the base plate 60, in which case the first bores 84, second bores 112 and first pins 114 would be unnecessary. The retainer 68 is a substantially rectangular member and has extending downwardly therefrom a second hook 116 adapted to engage a substantially rectangular slot 17 of the standard 14 and below the substantially square slot 16 in which the first hook 90 is adapted to engage. Thus, the retainer 68 functions as a means of support for the panel 12 to the standard 14.

The base plate 60 is mounted to the rear side 118 of the panel 12, on a side 50 thereof between the upper flange 46 and the lower flange 48 of the panel and in sucha position that the plug lock 64 is accessible through the hole 52 in the panel and the red mark 102 on the front surface 100 of the bar lock is visible through the aperture 54 in the panel when the first hook 90 is set in the lower position. The base plate 60 is rigidly attached to the panel, in the above-described position, by a plurality of second pins 120 which extend through the orifices 82 of the base plate and into locking engagement with and between the walls 58 of channels 56 of the panel 12. In this position, the rear side 118 of the panel 12 limits forward movement of the bar lock 62 and the plug lock 64 to thereby securely position these elements of the latch 10 within the bar lock guide 70 and the plug lock guide 78, respectively, of the base plate 60. With the base plate 60 mounted to the panel 12, the base plate is adapted to securely mount the panel 12 to the vertical standard 14.

To securely mount panel 12 to the vertical standard 14, the panel 12 is positioned at an acute angle with respect to the standard 14 and the second hook 116 is engaged with a selected substantially rectangular slot 17 of the vertical standard to at least partially mount the panel 12 to the standard. With the first hook 90 set in the lower position, the panel 12 is then mounted to such a position that (1) the first hook 90 engages a substantially square slot 16 of the standard and above the slot 17 in which the second hook is engaged, and (2) the panel is in flush engagement with the standard. In the unlocked position, the red mark on the bar lock is visible through the aperture in the panel 12. It is important to note that if the first hook 90 is set in the upper position subsequent to engaging the second hook with the selected slot 17, the front face 122 of the standard would interfere with rearward movement of the first hook when the panel is raised toward a position of flush engagement with the standard and thereby prevent engagement of the first hook with a slot 16 of the standard. Subsequent to positioning the first hook 90 within a slot 16 of the standard 14, the plug lock 64 is rotated in the clockwise direction. As the plug lock 64 rotates in the plug guide 70, the force exerted on the bar lock 62 by the tab 106 of the plug lock causes the bar lock 62 to move vertically upward in the bar lock guide 70 to move the first hook into a position of locking engagement with the rear face 124 of the standard and above the slot in which the first hook is engaged. In this manner, the bar lock 62 functions as a means for securely latching the panel 12 to the vertical standard 14 by preventing disengagement of the panel from the standard through interference of the rear face 124 with forward movement of the first hook 90. At this time, the red mark is hidden behind the rear side 118 of the panel 12 and thus is not visible through the aperture 54. This indicates that the panel 12 is securely mounted to the standard 14. Visible through the aperture, the red mark 102 indicates that the latch 10 is in the unlocked position and thus the panel 12 is not securely mounted to the standard 14. Therefore, the red mark 102 functions as a means of warning the user that the latch 10 is in the unlocked position and that the panel is not securely mounted to the standard 14. The first hook 90 is retained in the locked position by the camming action of the forward surface 94 of the first hook with the rear face 124 of the standard 14 and the spring 66 which exerts a continuous upwardly directed force on the bar lock 62.

When it is desirable to detach the panel 12 from the vertical standard 14, the plug lock 64 is rotated in the counter-clockwise direction causing the bar lock 62 to slide vertically downward in the bar lock guide 70 to such a position that the first hook 90 no longer engages the rear face 124 of the standard. At this time, the red mark 102 on the bar lock 62 is viewable through the aperture 54 in the panel 12, thereby indicating that the first hook 90 is in the unlocked lower position. Since the rear face 124 of the standard 14 no longer interferes with forward movement of first hook 90, the panel 12 may then be tilted forward to disengage the first hook 90 with the slot 14 and subsequently lifted vertically upward with respect to the standard to disengage the second hook from the selected slot of the standard.

While the invention has been described in connection with the preferred embodiment, it will be understood that the invention is not limited to that embodiment. To the contrary, reasonable alternatives, modifications and equivalents are possible within the spirit and scope of the invention as defined by the appended claims.

The embodiments of the invention in which an exclusive property or privilege is claimed are defined as follows:

1. A wall panel having a front and a back and adapted to be removably mounted to a vertical slotted standard having a plurality of vertically spaced slots, a front face and a rear face, said panel comprising:
    a support means secured to said panel and registrable with a first slot of said standard to at least partially support said panel on said standard;
    a latch means mounted to said panel, vertically movable between locked and unlocked positions, registrable with a second slot of said standard, when said latch means is in said unlocked position and said support means extends through said first slot, and engageable with said rear face of said standard adjacent said second slot, when said latch means is in said locked position and said support means engages said rear face adjacent said first slot, to securely mount said panel to said standard; and
    an actuating means movably mounted to said panel and for actuating movement of said latch means between said locked and unlocked positions.

2. A wall panel according to claim 1, wherein said support means comprises a second hook secured to said back surface and adapted to extend through said first slot and engage said rear face adjacent said first slot to partially mount said panel to said standard.

3. A wall panel according to claim 1, wherein said panel further comprises a first channel and an opening extending through said back and in registry with said first channel; and
    said latch means comprises a bar lock slidably mounted within said first channel and having a first hook adapted to extend through said opening and said second slot, when said bar lock is in said unlocked position and said support means extends through said first slot, and to engage said rear face of said standard adjacent said second slot when said latch means is in said locked position and said support means engages said rear face adjacent said first slot to securely mount said panel to said standard.

4. A wall panel according to claim 1, wherein said panel further comprises a second channel; and
    said actuating means comprises a plug lock movably mounted within said second channel, said plug lock engaging said latch means and adapted to move said latch means in said locked position when moved in a first direction and to position said latch means in said unlocked position when moved in a second direction.

5. A wall panel according to claim 1, wherein said panel further comprises an aperture extending through said front and a warning means viewable through said aperture only when said latch means is disposed in said unlocked position.

6. A wall panel according to claim 1, wherein said support means comprises a second hook secured to said back and adapted to extend through said first slot and engage said rear face adjacent said first slot to partially mount said panel to said standard;
    said panel further comprises a first channel, a second channel and an opening extending through said back and in registry with said first channel;
    said latch means comprises a bar lock slidably mounted within said first channel and having a first hook adapted to extend through said opening and said second slot, when said bar lock is in said unlocked said second hook extends through said first slot, and to engage said rear face adjacent said second slot, when said bar lock is in said locked position and said second hook engages said rear face adjacent said first slot, to securely mount said panel to said standard; and
    said actuating means comprises a plug lock movably mounted within said second channel engaging said bar lock, and adapted to move said bar lock to said locked position when moved in a first direction and to position said bar lock in said unlocked position when moved in a second direction.

7. A wall panel according to claim 6, wherein said panel further comprises an aperture extending through said front and a warning means viewable through said aperture only when said bar lock is disposed in said unlocked position.

8. A wall panel according to claim 7, wherein said bar lock further comprises a notch; and
    said plug lock comprises a tab engaging said notch; whereby movement of said plug lock in said first direction disposes said bar lock in said locked position through forces exerted on said bar lock by said tab, to thereby securely mount said panel to said standard.

9. A wall panel according to claim 8, wherein said warning means comprises a red mark on a front surface of said bar lock and which is viewable through said aperture in said front only when said bar lock is disposed in said unlocked position.

10. A wall panel according to claim 9, wherein said actuating means further comprises a spring positioned in said first channel and between said bar lock and a side of said first channel and for biasing said first hook in said locked position in engagement with said rear face of said standard.

11. A wall panel according to claim 10, wherein said panel further comprises a hole extending through said front and through which access may be gained to said plug lock to move said plug lock in said first and second directions to position said bar lock in said locked and unlocked positions, respectively.

12. A device for removably mounting a panel to a vertical slotted standard having a plurality of slots and a rear face, said device comprising:
   a base plate securable to said panel and having front and back walls;
   a support means secured to said base plate, registrable with a first slot of said standard and engagable with said rear face of said standard adjacent said first slot to at least partially support said panel on said standard;
   a latch means mounted to said base plate for vertical movement between locked and unlocked positions, registrable with a second slot of said standard, when said latch means is in said unlocked position and said support means extends through said first slot, and engageable with said rear face of said standard adjacent said second slot, when said latch means is in said locked position and said support means engages said rear face adjacent said first slot, to securely mount said panel to said standard; and
   an actuating means movably mounted to said base plate and for actuating movement of said latch means between said locked and unlocked positions.

13. A device according to claim 12, wherein said support means comprises a second hook secured to said back surface and adapted to extend through said first slot and engage said rear face adjacent said first slot to partially mount said panel to said standard.

14. A device according to claim 12, wherein said base plate further comprises a first channel and an opening extending through said back wall and in registry with said first channel; and
   said latch means comprises a bar lock slidably mounted within said first channel and having a first hook extending through said opening and adapted to extend through said second slot, when said latch means is in said unlocked position and said support means extends through said first slot, and to engage said rear face of said standard adjacent said second slot, when said latch means is in said locked position and said support means engages said rear face adjacent said first slot, to securely mount said panel to said standard.

15. A device according to claim 12, wherein said base plate further comprises a second channel; and
   said actuating means comprises a plug lock movably mounted within said second channel, engaging said latch means and adapted to position said latch means in said locked position when moved in a first direction and to position said latch means in said unlocked position when moved in a second direction.

16. A device according to claim 12, wherein said panel further comprises an aperture; and
   said device further comprises a warning means viewable through said aperture only when said latch means is disposed in said unlocked position.

17. A device according to claim 12, wherein said support means comprises a second hook secured to said back wall and adapted to extend through said first slot and engage said rear face adjacent said first slot to partially mount said panel to said standard;
   said base plate further comprises a first channel, a second channel and an opening extending through said back wall and in registry with said first channel;
   said latch means comprises a bar lock slidably mounted within said first channel and having a first hook extending through said opening and adapted to extend through said second slot, when said bar lock is in said unlocked position and said second hook extends through said first slot, and to engage said rear face of said standard adjacent said second slot when said latch is in said locked position and said second hook engages said rear face adjacent first slot, to securely mount said panel to said standard; and
   said actuating means comprises an plug lock movably mounted within said second channel, engaging said bar lock and adapted to move said bar lock in said locked position when moved in said first direction and to move said bar lock in said unlocked position when moved in said second direction.

18. A device according to claim 17, wherein said panel further comprises an aperture; and
   said device further comprises a warning means viewable through said aperture only when said bar lock is in said unlocked position.

19. A device according to claim 18, wherein said bar lock further comprises a notch; and
   said plug lock comprises a tab engaging said notch;
   whereby movement of said actuator in said first direction disposes said bar lock in said locked position, through forces exerted on said bar lock by said tab, to thereby securely mount said panel to said standard.

20. A device according to claim 19, wherein said warning means comprises a red mark on a front surface of said bar lock and which is viewable through said aperture in said panel only when said bar lock is disposed in said unlocked position.

21. A device according to claim 20, wherein said actuating means further comprises a spring positioned in said first channel and between said bar lock and a side of said first channel and for biasing said bar lock in said locked position in engagement with said rear surface of said vertical standard.

22. A device according to claim 12, wherein said panel further comprises a hole through which access may be gained to said plug lock to move said plug lock in said first and said second directions to position said bar lock in said locked and unlocked positions, respectively.

* * * * *